United States Patent
Wu et al.

(10) Patent No.: US 7,761,648 B2
(45) Date of Patent: Jul. 20, 2010

(54) CACHING METHOD FOR NAND FLASH TRANSLATION LAYER

(75) Inventors: Chin-hsien Wu, Taipei (TW); Tei-wei Kuo, Taipei (TW); Hsiang-chi Hsieh, Sindian (TW)

(73) Assignee: Genesys Logic, Inc., Taipei (TW)

( * ) Notice: Subject to any disclaimer, the term of this patent is extended or adjusted under 35 U.S.C. 154(b) by 398 days.

(21) Appl. No.: 11/844,032

(22) Filed: Aug. 23, 2007

(65) Prior Publication Data

US 2008/0126684 A1    May 29, 2008

(30) Foreign Application Priority Data

Nov. 23, 2006   (TW) .............................. 95143300 A

(51) Int. Cl.
*G06F 12/10*    (2006.01)
(52) U.S. Cl. ........................... 711/3; 711/103; 711/118; 711/202; 711/203
(58) Field of Classification Search ........................ None
See application file for complete search history.

(56) References Cited

U.S. PATENT DOCUMENTS

| | | | | |
|---|---|---|---|---|
| 6,732,222 | B1* | 5/2004 | Garritsen et al. ............ | 711/103 |
| 6,922,768 | B2* | 7/2005 | Honda et al. ................ | 711/206 |
| 2007/0300009 | A1* | 12/2007 | Rogers et al. ............... | 711/103 |
| 2008/0162792 | A1* | 7/2008 | Wu et al. .................... | 711/103 |
| 2008/0211518 | A1* | 9/2008 | Hancock et al. ............. | 324/647 |
| 2008/0282045 | A1* | 11/2008 | Biswas et al. ............... | 711/159 |

FOREIGN PATENT DOCUMENTS

| | | |
|---|---|---|
| TW | 1249670 | 2/2006 |
| TW | 1253564 | 4/2006 |

* cited by examiner

*Primary Examiner*—Jack A Lane

(57) ABSTRACT

A caching method provides a cashing mechanism between a logical addresses and a flash memory physical addresses. The caching mechanism involves a search tree which contains a number of internal and external translation nodes. Each external translation node points to a link list of translation units, and each translation unit records a range of logical addresses and the corresponding range of physical addresses, in addition to a version value. By traversing the search tree to reach a translation unit, the physical address of a target logical address can be determined in an efficient manner. The version value of the translation unit can be used to determine the space taken up for storing the mapping of the logical and physical addresses should be released for reuse.

13 Claims, 5 Drawing Sheets

CACHING METHOD FOR NAND FLASH TRANSLATION LAYER

BACKGROUND OF THE INVENTION

1. Field of the Invention

The present invention generally relates to the management of NAND flash memory, and more particularly to a caching method for NAND flash translation layer of the NAND flash memory.

2. The Related Arts

Flash memories are commonly found in computers and consumer electronic products. For example, USB disks and MP3 players are the two most common applications of the flash memories. Among various types of flash memories, NAND flash memories are commonly found in embedded systems. A NAND flash memory is organized into fixed-size pages (for example 512 bytes per page) and a number of pages constitute a block (for example 32 pages per block). A characteristic of the NAND flash memory is that two pages of the same block cannot be written simultaneously unless that block is erased first. Such an access characteristic of the NAND flash memory presents a difficulty in its management.

To make a NAND flash memory to work under an existing file system and format (such as FAT16/32, NTFS, EXT2, etc.), the most frequently adopted approach is to maintain an address translation table mapping logical addresses to physical addresses of the NAND flash memory. As such, the NAND flash memory can be simulated into a continuous memory space and, without altering the existing file system and format, the NAND flash memory can be treated as, for example, a hard disk. This approach is referred to as the NAND flash translation layer.

As the capacity of the NAND flash memory is increased, the NAND flash translation layer uses a block-level mapping mechanism to reduce RAM (Random Access Memory) space required to maintain the address translation table. However, the block-level mapping is inefficient in mapping logical addresses to the physical flash memory addresses. This is because the flash memory is read or written in units of pages but to obtain a new page address, under the block-level mapping, the pages in a block have to be searched and this takes time. As such, the efficiency and speed in reading and writing the NAND flash memory are affected.

In the prior arts, for example, Taiwan Patent Publication Nos. I253564 and I249670 teach a typical flash memory address translation technique, a management method of good and bad blocks, and a method and technique for sequentially writing data into the flash memory from virtual blocks. These teachings also require mapping logical addresses to physical flash memory addresses in accessing data, and suffer the same inefficient problem.

SUMMARY OF THE INVENTION

Accordingly, the present invention provides a space-efficient caching mechanism for the NAND flash translation layer so as to increase the efficiency of mapping logical addresses to physical flash memory addresses.

An objective of the present invention is to provide a caching method for the NAND flash translation layer that adopts a search tree with internal and external translation nodes between the logical addresses and the flash memory physical addresses so as to speed up the read and write accesses to the flash memory.

Another objective of the present invention is to provide caching method for the NAND flash translation layer that can efficiently locate the space occupied by those logical addresses and their corresponding physical addressed that have not been used for a long time, and release the space for reuse.

To achieve the foregoing objectives, the present invention provides a caching method that provides a caching mechanism between the logical addresses and the flash memory physical addresses. The caching mechanism involves a search tree which contains a number of internal and external translation nodes. Each external translation node points to a link list of translation units, and each translation unit records a range of logical addresses and the corresponding range of physical addresses, in addition to a version value. By traversing the search tree to reach a translation unit, the physical address of a target logical address can be determined in an efficient manner. The version value of the translation unit can be used to determine the space taken up for storing the mapping of the logical and physical addresses should be released for reuse.

The foregoing and other objects, features, aspects and advantages of the present invention will become better understood from a careful reading of a detailed description provided hereinafter with appropriate reference to the accompanying drawings, in which:

DETAILED DESCRIPTION OF THE PREFERRED EMBODIMENTS

The following descriptions are exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

Figure 1:
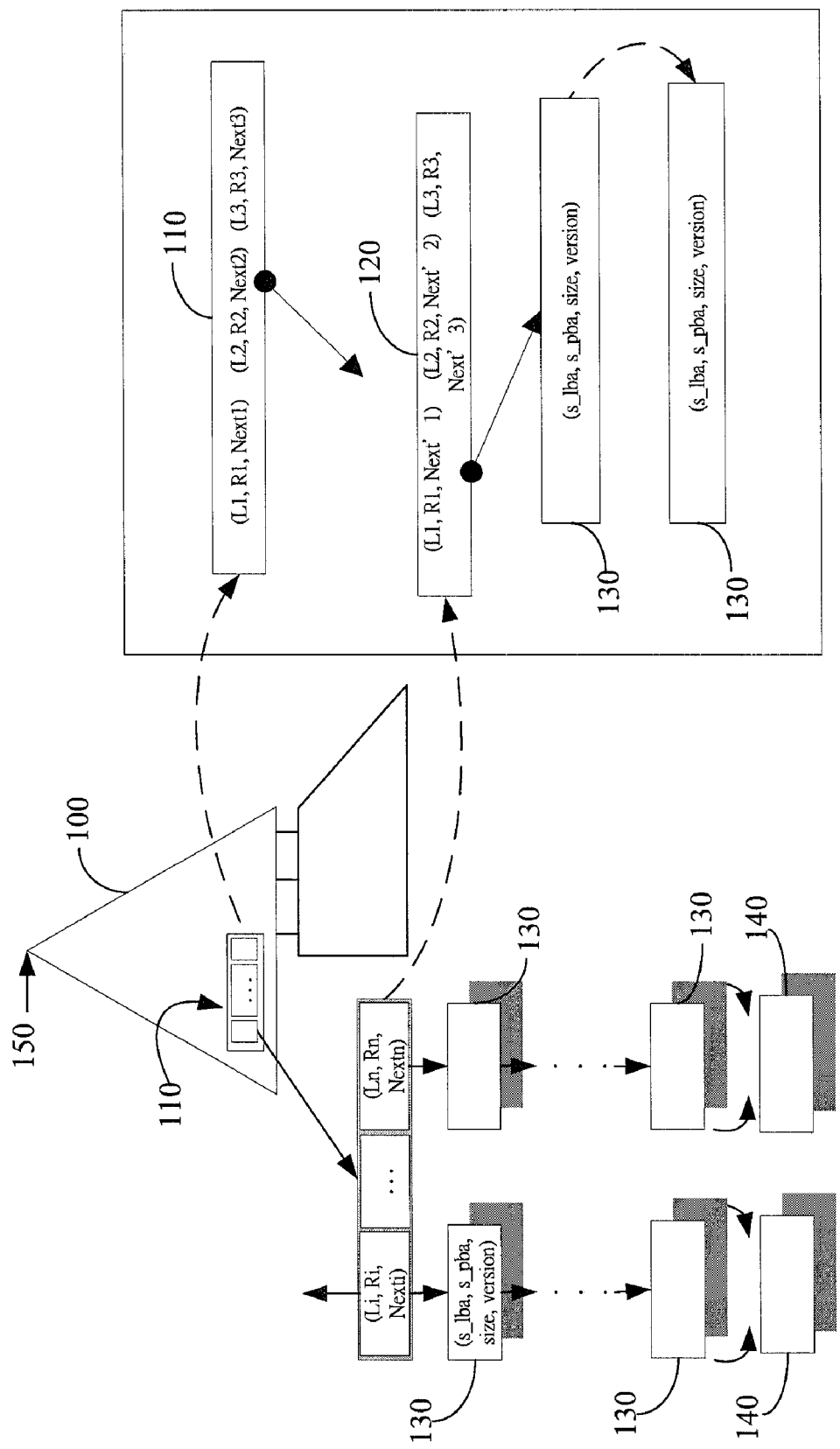
FIG. 1 is a schematic diagram showing a caching mechanism according to a caching method of the present invention.

With reference to the drawings and in particular to FIG. 1, which is a schematic diagram showing a caching mechanism according to a caching method of the present invention, as illustrated, a search tree 100 is provided which contains a number of internal translation nodes 110 and external translation nodes 120, assuming that there are "n" internal translation nodes 110 and "n" external translation nodes 120. Each internal translation node 110 is assigned an attribute (Li, Ri, Nexti) where i=1 to n. The first and second attribute values Li and Ri specify the first and last logical addresses of a logical address range, respectively, and the third attribute value Nexti points to an external translation node 120 whose attribute's logical address range would fall within the range [Li, Ri] (namely, larger than or equal to Li but less than or equal to Ri).

The internal translation nodes 110 are all within the search tree 100 while the external translation nodes 120 are the "leaves" of the search tree 100.

Each external translation node 120 is also assigned an attribute (Li, Ri, Next'i) where the attribute value Next'i points to a link list 140 of translation units 130. Each translation unit 130 within the link list 140 specifies a range of consecutive flash memory physical addresses corresponding to a range of consecutive logical addresses, which also fall within the external translation node 120's range [Li, Ri]. As shown in FIG. 1, each translation unit 130 is assigned an attribute (s_lba, s_pba, size, version) where the attribute value s_lba specifies the first logical address of the range of logical addresses, the attribute value s_pba specifies the first physical address of the range of the flash memory physical addresses, the attribute value size specifies the length of the range (namely, number of addresses), and the attribute value version is a timestamp of the translation unit 130.

Figure 2:
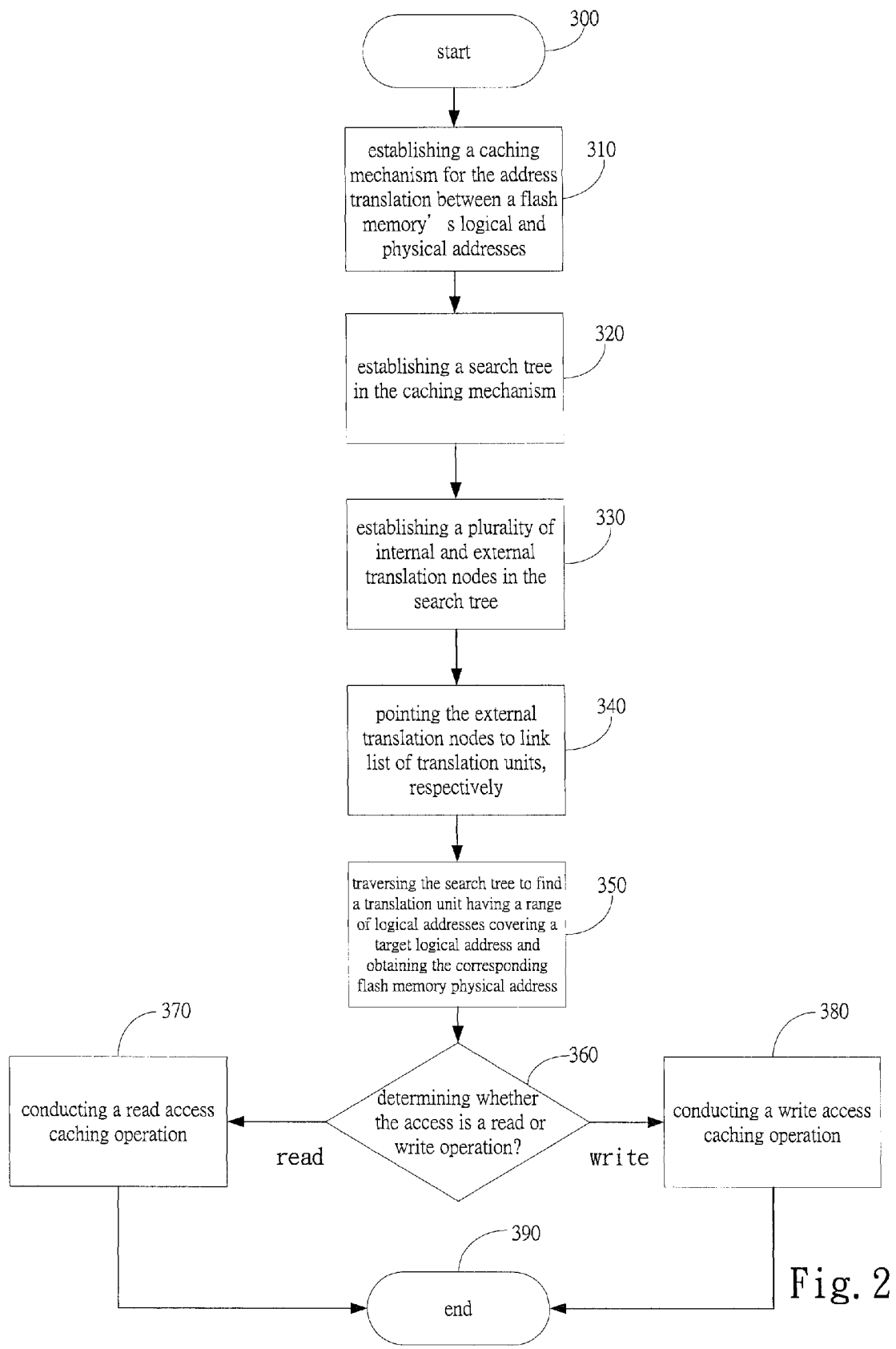
FIG. 2 is a flow diagram showing processing steps of the caching method for the NAND flash translation layer according to the present invention.

FIG. 2 is a flow diagram showing the processing steps of the caching method for the NAND flash translation layer according to the present invention. As illustrated, the processing steps 300 to 390 are as follows:

(300) start;

(310) a caching mechanism for the address translation between a flash memory's logical and physical addresses is established;

(320) a search tree is established in the caching mechanism (that is, a search structure such as the search tree 100 of FIG. 1 is provided in the caching mechanism provided by step 310);

(330) a number of internal and external translation nodes are established in the search tree (that is, a number of internal and external translation nodes 110 and 120 of FIG. 1 are provided in the search tree 100 provided by step 320);

(340) the pointing relationships among the external translation nodes, the translation units, and the link lists are established (that is, the relationships between the translation units 130 and link lists 140 of FIG. 1, and the relationships between the link lists 140 of FIG. 1 with the external translation nodes 120 of step 330 are provided; each translation unit 130 specifies a range of consecutive flash memory physical addresses corresponding to a range of consecutive logical addresses; a number of translation units 130 are connected into a link list 140; and an external translation node 120 points to the link list 140);

(350) the mapping relationship between a logical address and a physical address is determined by following the caching mechanism (that is, for an access targeting a logical address, the corresponding physical address is determined by starting from the root 150 of the search tree 100 provided by the step 320; traversing through a number of internal translation nodes 110 and reaching an external translation node 120, all provided by the step 330; then, whether a translation unit 130 within a link list 140 provided by the step 340 containing the logical address is determined; if yes, the translation unit 130 is used to obtain the corresponding flash memory physical address);

(360) whether the access is a read or write operation is determined; if it is a read operation, the process continues to the step 370; otherwise, the process continues to the step 380;

(370) a read access caching operation is conducted (that is, according to the mapping relationship between the logical and physical addresses determined by the step 350, a read access caching operation is conducted on the data to be read) and the process continues to the step 390;

(380) a write access caching operation is conducted (that is, according to the mapping relationship between the logical and physical addresses determined by the step 350, a write access caching operation is conducted on the data to be written); and (390) end.

Figure 3:
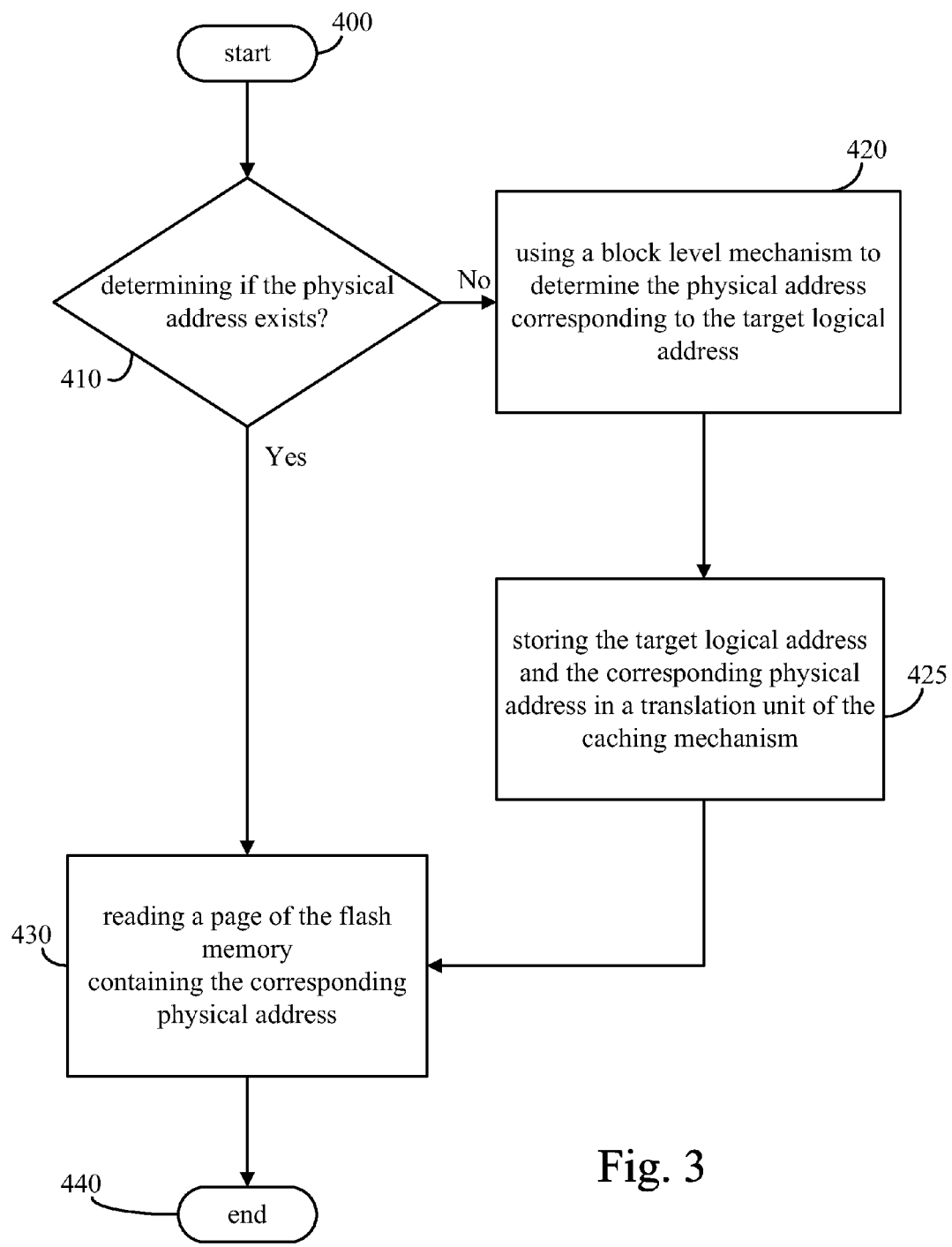
FIG. 3 is a flow diagram showing processing steps of read access caching operation of the NAND flash translation layer caching method according to the present invention.

FIG. 3 is a flow diagram showing the processing steps of the read access caching operation of the NAND flash translation layer caching method according to the present invention. As illustrated, the processing steps 400 to 440 are as follows:

(400) start;

(410) if the corresponding physical address exists is determined; if yes, the process continues to the step 430; otherwise the process continues to the step 420;

(420) a block level mechanism is used to determine the physical address corresponding to the logical address;

(425) the logical address and the newly determined physical address are stored in a translation unit of the caching mechanism;

(430) a page of the flash memory containing the determined physical address is read; and (440) end.

Figure 4:
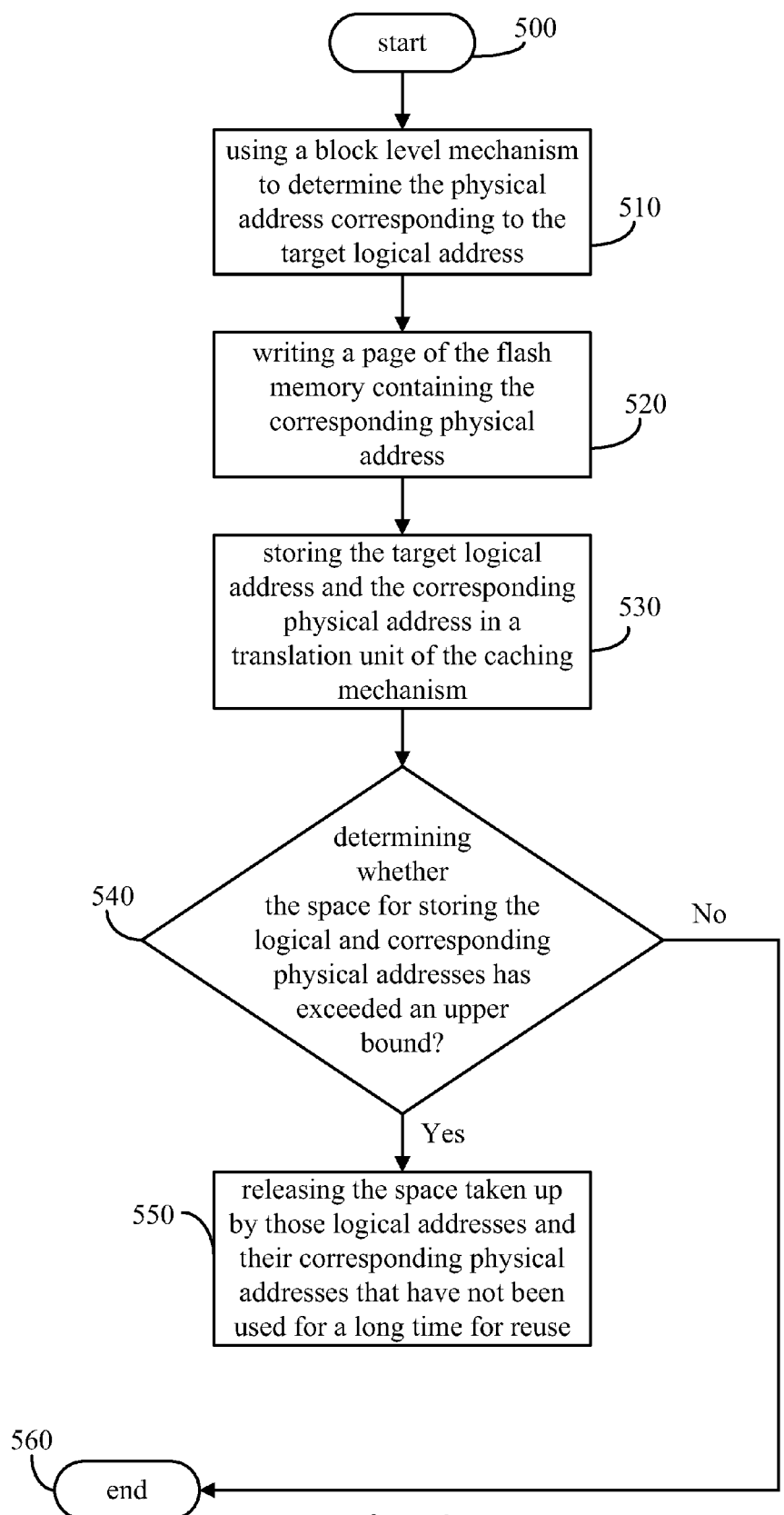
FIG. 4 is a flow diagram showing processing steps of write access caching operation of the NAND flash translation layer caching method according to the present invention.

FIG. 4 is a flow diagram showing the processing steps of the write access caching operation of the NAND flash translation layer caching method according to the present invention. As illustrated, the processing steps 500 to 560 are as follows:

(500) start;

(510) a block level mechanism is used to determine the physical address corresponding to the logical address;

(520) a page of the flash memory containing the determined physical address is written;

(530) the logical address and the newly determined physical address are stored in a translation unit of the caching mechanism;

(540) whether the space for storing logical and corresponding physical addresses has exceeded an upper bound is determined; if yes, the process continues to the step 550; otherwise, the process continues to the step 560;

(550) the space taken up by those logical addresses that have not been used for a long time and their corresponding physical addresses are released for reuse, based on the version values of the translation units; and (560) end.

Figure 5:
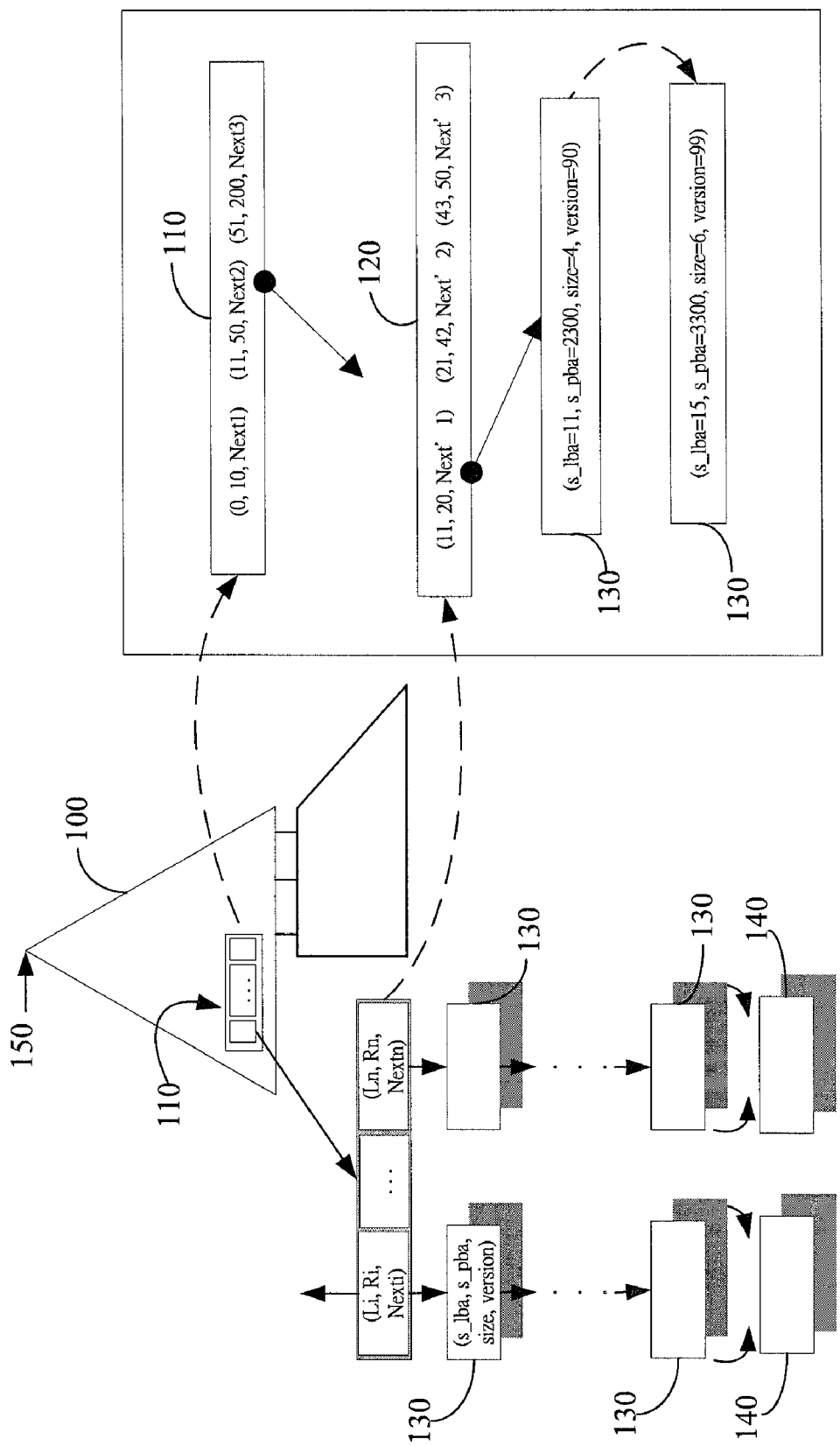
FIG. 5 is a schematic diagram showing an application scenario of the caching mechanism of FIG. 1.

FIG. 5 is a schematic diagram showing an application scenario of the caching mechanism of FIG. 1. This is to be used as an example illustrating how the data structures of the caching mechanism are employed in the read or write accesses.

For example, to obtain the physical address corresponding to a logical address 17, an internal translation node 110 having attributes [(0, 10, Next1), (11, 50, Next2), (51, 2000, Next3)] is found. Based on its attributes, the pointer Next2 is traversed to reach an external translation unit 120 having attributes [(11, 20, Next'1), (21, 42, Next'2), (43, 50, Next'3)]. Again, based on the attributes, the pointer Next'1 is traversed to reach a translation unit 130 having attribute (s_lba=15, s_pba=3300, size=6, version=99). Then, the corresponding physical address can be determined by following the formula (target logical address−s_lba+s_pba) which is equal to 3302 (17−5+3300). On the other hand, the version 99 can be used to determine whether the space taken up by those logical addresses and their corresponding physical addresses that have not been used for a long time should be released.

Although the present invention has been described with reference to the preferred embodiments thereof, it will be understood that the invention is not limited to the details described thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. A caching method for NAND flash translation layer, comprising the following steps:
   (A) starting;
   (B) establishing a caching mechanism for the address translation between a flash memory's logical and physical addresses;
   (C) establishing a search tree in the caching mechanism;
   (D) establishing a plurality of internal and external translation nodes in the search tree, wherein each internal translation node is assigned a first set of attribute value, and each external translation node is assigned a second set of attribute value, wherein the first set of attribute value comprises a first parameter to point to the external translation node, and the second set of attribute value comprises a second parameter to point to a link list of at least a translation unit;
   (E) pointing the external translation nodes to link list of translation units, respectively, wherein each translation unit specifies a range of consecutive flash memory physical addresses corresponding to a range of consecutive logical addresses, a number of translation units are connected into a link list, and an external translation node points to the link list;
   (F) For a target logical address, determining if a translation unit having a range of logical addresses covers the target logical address is found by traversing the search tree from the root and, if yes, obtaining the corresponding flash memory physical address using the translation unit;
   (G) determining whether the access is a read or write operation and, if it is a read operation, continuing to step (H); otherwise, continuing to step (I);
   (H) conducting a read access caching operation based on the determined physical address and continuing to step (J);
   (I) conducting a write access caching operation based on the determined physical address; and
   (J) ending.

2. The caching method as claimed in claim 1, wherein the first set of attribute value comprises a first attribute value and a second attribute value.

3. The caching method as claimed in claim 2, wherein the first and second attribute values specify the first and last logical addresses of a logical address range, respectively.

4. The caching method as claimed in claim 1, wherein the second set of attribute value comprises a first attribute value and a second attribute value.

5. The caching method as claimed in claim 4, wherein the first and second attribute values specify the first and last logical addresses of a logical address range, respectively.

6. The caching method as claimed in claim 1, wherein each translation unit is assigned a third set of attribute value.

7. The caching method as claimed in claim 6, wherein the third set of attribute value comprises a fifth attribute value, a sixth attribute value, a seventh attribute value, and an eighth attribute value.

8. The caching method as claimed in claim 7, wherein the fifth attribute value specifies the first logical address of the range of logical addresses.

9. The caching method as claimed in claim 7, wherein the sixth attribute value specifies the first physical address of a range of the flash memory physical addresses.

10. The caching method as claimed in claim 7, wherein the seventh attribute value specifies the length of the range of the logical addresses.

11. The caching method as claimed in claim 7, wherein the eighth attributes is a timestamp of the translation unit.

12. The caching method as claimed in claim 1, wherein the read access caching operation comprises the following steps:
    (H1) starting;
    (H2) determining if the physical address exists and, if yes, continuing to step (H4), otherwise continuing to step (H3);
    (H3) using a block level mechanism to determine the physical address corresponding to the target logical address;
    (H31) storing the target logical address and the corresponding physical address in a translation unit of the caching mechanism;
    (H4) reading a page of the flash memory containing the corresponding physical address; and
    (H5) ending.

13. The caching method as claimed in claim 1, wherein the write access caching operation comprises the following steps:
    (I1) starting;
    (I2) using a block level mechanism to determine the physical address corresponding to the target logical address;
    (I3) writing a page of the flash memory containing the corresponding physical address;
    (I4) storing the target logical address and the corresponding physical address in a translation unit of the caching mechanism;
    (I5) determining whether the space for storing the logical and corresponding physical addresses has exceeded an upper bound and, if yes, continuing to the step I6, otherwise continuing to step (I7);
    (I6) releasing the space taken up by those logical addresses and their corresponding physical addresses that have not been used for a long time for reuse, based on a version value of the translation unit; and
    (I7) ending.

* * * * *